United States Patent [19]

Oddenino

[11] Patent Number: 5,619,776
[45] Date of Patent: Apr. 15, 1997

[54] INTEGRATED AUTOMOTIVE UPHOLSTERING ELEMENT AND RELATIVE FABRICATION METHOD

[75] Inventor: Manrico Oddenino, Buttigliera Alta, Italy

[73] Assignee: ITW Fastex Italia S.p.A., Strada Settimo, Italy

[21] Appl. No.: 615,007

[22] Filed: Mar. 12, 1996

[30] Foreign Application Priority Data

Mar. 17, 1995 [IT] Italy .................................. TO95A0205

[51] Int. Cl.$^6$ .................................................. A44B 21/00
[52] U.S. Cl. .................................. 24/298; 24/300; 24/302
[58] Field of Search ............................... 24/298, 300, 302

[56] References Cited

U.S. PATENT DOCUMENTS

| 4,554,711 | 11/1985 | Derringer | 24/300 |
| 4,769,875 | 9/1988 | Hartman | 24/298 |
| 5,467,507 | 11/1995 | Marsh et al. | 24/298 |

FOREIGN PATENT DOCUMENTS

| 1188146 | 12/1987 | Italy . | |
| 1210774 | 10/1970 | United Kingdom | 24/298 |

*Primary Examiner*—Victor N. Sakran
*Attorney, Agent, or Firm*—Schwartz & Weinrieb

[57] ABSTRACT

An integrated upholstering element presenting a supporting element made of plastic material and molded onto a lateral edge of a tape and onto a first end of at least one tie presenting, towards a second end opposite the first and in a predetermined axial position, at least one retaining element made of synthetic plastic material and also molded onto the tie. A series of integrated upholstering elements are injection molded one at a time in a system featuring two mating half molds, between which the tape and the ties are stretched between respective feed-off reels and gripping devices; after being molded, each integrated element is translated by a sufficient amount to feed a further free portion of the tape and ties between the half molds and the gripping devices, to perform the next molding operation; and the previously molded integrated element is detached by cutting the tape and ties downstream from the gripping devices.

19 Claims, 1 Drawing Sheet

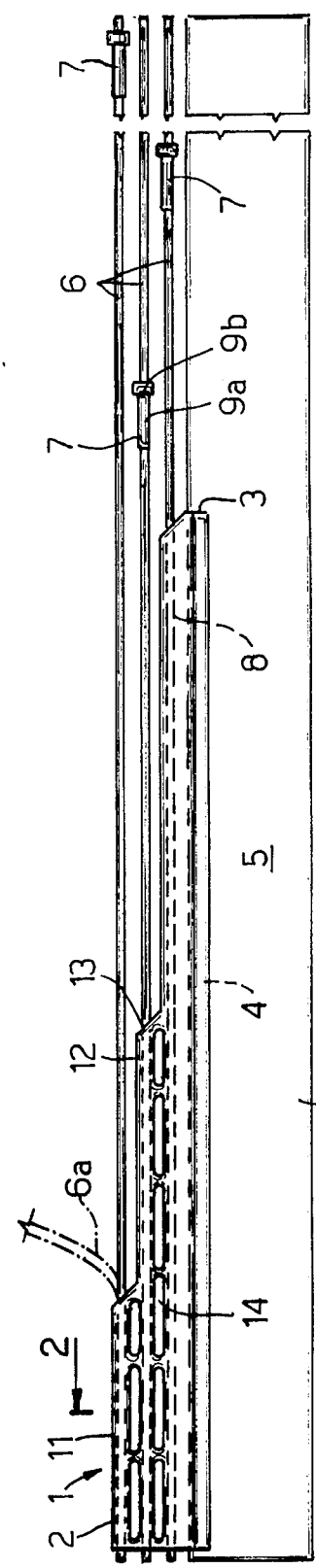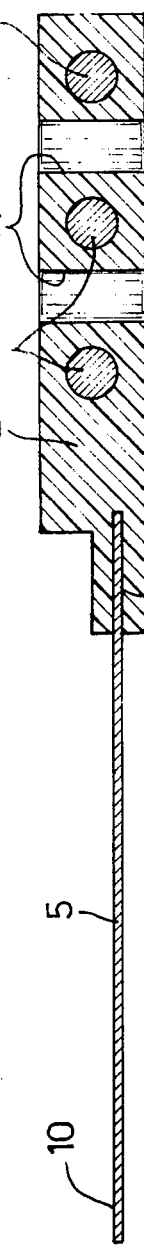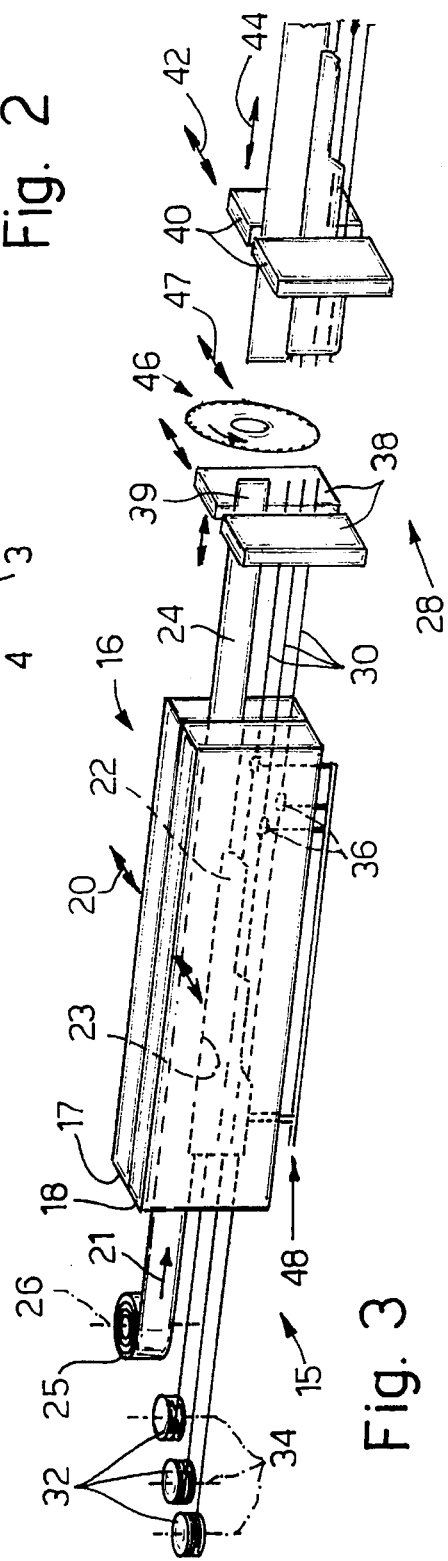

5,619,776

INTEGRATED AUTOMOTIVE UPHOLSTERING ELEMENT AND RELATIVE FABRICATION METHOD

FIELD OF THE INVENTION

The present invention relates to an integrated upholstering element for keeping the fabric cover of seats, particularly vehicle seats, stretched firmly onto the seat padding, and to a relative fabrication method.

BACKGROUND OF THE INVENTION

In automotive upholstering, extensive use is made of means for stretching the fabric cover onto the seat padding, for example, the use of ties of all types, connected between given points of the fabric cover and anchoring points normally on rigid supporting structures, such as, for example, the supporting structure of the seat itself.

Currently used ties comprise a length of flexible cable such as, for example, stranded NYLON (registered trade mark) cable, fitted with one or more connecting or anchoring elements normally made of plastic.

In previous Italian Patent N. 1.188.146 issued on Dec. 30, 1987 and entitled: "Method and system for producing flexible ties with randomly arranged connecting elements", the present Applicant describes a tie fabricating method whereby a flexible cable, continuously unwound off a reel, is fed through a pair of half molds between which retaining elements, spaced a given distance apart, are injection molded directly onto the cable. After each molding operation, the cable is fed forward by an appropriate length and cut off. To reduce the length of the mold in relation to the length of the cable portion fed through it, blades are fitted inside cavities in one of the half molds to form loops in the cable and so enable a relatively long portion of cable to be accommodated in a very small space.

In the above method, the terminal retaining element on the tie is in the form of an eyelet, while the others formed along the cable portion are button-shaped, and a number of identical ties are fitted at different heights to a supporting rod along which the eyelet of each tie is manually positioned. The rod is made of metal or plastic, and is fitted inside a tubular fabric element stitched to the inside of the After being fitted through the thickness of the padding, the ties are tightly anchored to a convenient connecting point by means of one of the buttons, which differs from one tie to another depending on its location along the supporting rod. Any excess cable, together with the unused retaining elements, is either cut off at assembly or left under the padding, both of which solutions obviously involve a certain amount of waste.

Ties formed as described above present several drawbacks, foremost of which is the high cost of assembly, which must be performed entirely manually so as to slip the eyelets one at a time onto the supporting rod, and to feed the rod from one connecting position to the next inside the tubular fabric element, which must also be stitched beforehand to the fabric cover.

Moreover, the need, for reasons of standardization, for producing identical ties, only a small part of most of which is eventually used, results in relatively high cost in terms of waste, and fairly complex molding equipment is required, which means additional costs for producing the molds, and higher operating costs due to the additional maintenance involved.

OBJECTS OF THE INVENTION

It is an object of the present invention to provide novel means of stretching seat upholstery fabric onto the seat padding, and which provides for overcoming the drawbacks typically associated with currently used single-tie systems.

It is a further object of the present invention to provide a method of injection molding the ties and relative connecting elements, and which may be implemented using straightforward, compact equipment.

SUMMARY OF THE INVENTION

According to the present invention, there is provided an integrated upholstering element for securing a fabric cover firmly to the padding of a seat, particularly a vehicle seat, and comprising a tape capable of being stitched to the inside of the fabric cover; a supporting element fixed to the tape; and at least one flexible tie connected at a first end to the supporting element, and presenting, towards a second end opposite the first, at least one retaining member for engaging a corresponding connecting member on the seat supporting structure; characterized in that at least the first end of the tie and at least a portion of the tape are incorporated integrally in and in one piece with the supporting element; and the supporting element is made of synthetic plastic material and molded onto the tape and the said at least one tie.

The supporting element preferably comprises a flexible, injection molded strip, and presents a number of ties of the same length but embedded by different lengths inside the first end of the strip; each tie presenting, in a different axial position, one of the retaining member, which is also made of synthetic plastic material and injection molded onto the tie.

This therefore provides, as of the supporting element molding stage, for forming a complete unit ready for fixation to the fabric cover, which is effected in the traditional manner by stitching the tape to the inside of the cover. That is, by means of an operation already provided for anyway in the prior state of the art, but with the added difference that, by so molding the strip so as to fit the tape with all the ties required in each case for a given seat model, the fabric cover may be sent to the assembly line complete with ties of the required number, location and length.

BRIEF DESCRIPTION OF THE DRAWINGS

A preferred, non-limiting embodiment of the present invention will be described by way of example with reference to the accompanying drawings, in which like reference characters designate like or corresponding parts throughout the several views, and wherein:

FIG. 1 is a plan view of the integrated element according to the present invention;

FIG. 2 is a cross-sectional view of the element of FIG. 1 as taken along line 2—2 in FIG. 1;

FIG. 3 is a schematic view in perspective of an injection molding system for producing the integrated element in FIG. 1.

DETAILED DESCRIPTION OF THE INVENTION

Integrated upholstering element 1 according to the present invention, and as shown in FIGS. 1 and 2, provides for better and easier stretching of fabric covers onto padded seats, in the example shown, vehicle seats. Nevertheless, the scope of the present invention also extends to any other application (for example, furnishings, or the like) of element 1 as described herein, or of its technical equivalent.

Element 1 comprises a supporting element in turn comprising a flat rod segment defined by a strip 2 of a width much greater than its thickness, made of synthetic plastic material, and injection molded using the system of FIG. 3 as described in detail later on.

A lateral longitudinal strip portion 4 of a tape 5, defined by a length of flat strip longer than strip 2, is embedded within the thickness and along the full length of the longer lateral longitudinal edge 3 of strip 2. Tape 5 may be made of any natural or synthetic material (for example, non-woven, natural or synthetic fabric, or the like) enabling tape 5 to be stitched in a known manner to the inside of a known seat upholstery fabric (not shown).

Also within the thickness of strip 2 and lengthwise of strip 2 and tape 5, that is, parallel to edge 3, there is incorporated an end portion 8 of one or any number of ties 6 (three shown in FIG. 1) defined by portions of flexible, inextensible cable preferably made of stranded NYLON (registered trade mark) and projecting by a given length from strip 2. Ties 6 are all the same length as tape 5, and each is fitted, at the opposite end to that incorporated in strip 2, with at least one known retaining element or member 7 for engaging in a known manner (not shown) a corresponding connecting member on the supporting structure of the seat to which element 1 is applied.

Each tie 6 preferably presents only one element 7 located at a given axial position differing from that of the elements 7 of the other ties 6. Each element 7 is located some distance from end portion 8 incorporated in strip 2, is mushroom-shaped as shown in FIG. 1, and presents a shank 9a, and a head 9b on one end of the shank 9a. Needless to say, element 7 may be designed in any other manner, on the condition that it provides for safely and rapidly securing and evenly tensioning ties 6 to the supporting structure of the seat.

According to the present invention, supporting element or strip 2 is molded directly onto end portions 8 of different lengths, and onto portion 4 disposed on the opposite side of tape 5 with respect to the lateral edge 10 which is eventually stitched in a known manner to the inside of the fabric cover, so that, after molding, portion 4 and end portions 8 are integrally embedded in and in one piece with supporting element 2 so as to form an indivisible unit or "integrated" element 1. Similarly, elements 7 are also molded at appropriate positions onto ties 6.

In actual use, edge 10 of tape 5 is stitched in a known manner to the inside of the fabric cover (not shown); and the cover is placed on the seat padding, leaving ties 6 free, so that, on the assembly line, ties 6 are already arranged as required on the seat, and are simply pulled by the fitter substantially perpendicular to the axis of strip 2 so as to fit elements 7 into the connecting members on the supporting structure of the seat.

More generally, ties 6 are fanned out at different angles ranging between a line perpendicular to and a line parallel to the longitudinal axis of strip 2; and, to assist the bending of each tie 6, for example tie 6a, as shown by the dotted line in FIG. 1, strip 2 is defined, on the side opposite to side 3 attached to tape 5, by a segmented edge 11 comprising a number of steps 12, in particular a step 12 of a different length for each tie 6, so that each end portion 8 embedded in strip 2 and each free portion of each tie 6 projecting from strip 2 and fitted with element 7 present a different length. Each portion 13 of edge 11 between two adjacent steps 12 slopes approximately 45° with respect to the longitudinal axis of strip 2.

Strip 2 is preferably lightened by through openings 14 of various shapes, for example, slots, formed through its thickness directly during the molding stage by means of appropriate cores.

Integrated element 1 is produced wholly in one molding operation using the FIG. 3 injection molding system 15, which is similar to the one described in the aforementioned patent, to which reference is made herein as required for the purpose of full disclosure.

System 15 comprises a known injection molding machine 16 (shown only partly in FIG. 3 and not described in detail) which, in turn comprises two known half molds 17, 18 facing each other and movable towards and away from each other in the direction of arrows 20.

The mating inner surfaces of half molds 17, 18 present an injection mold cavity defining a molding chamber 22 complementary in shape to that of strip 2 in FIG. 1. Along one side of molding chamber 22—and more specifically, along the top side 23 of chamber 22 in FIG. 3—there is provided a seat (not shown in detail in FIG. 3) for receiving a strip 24 wound in direction 21 off a reel 25 rotating about an axis 26 and braked by a known friction device (not shown). By means of a known tensioning device 28, strip 24 is kept taut through half molds 17, 18, and in such a position that at least a lateral longitudinal portion of strip 24, corresponding to strip portion 4 (FIG. 2), projects inside chamber 22.

One or more flexible, inextensible cables 30, made for example of stranded NYLON (registered trade mark) and wound in direction 21 off respective reels 32 rotating about respective axes 34 and braked by known friction devices (not shown), are also kept taut through half molds 17, 18 by tensioning device 28. For the sake of simplicity, and purely by way of example, reference will be made in the following description to three cables 30.

Half molds 17, 18 also present injection mold cavities 36 defining, when the mold is closed, injection mold chambers complementary in shape to that of retaining elements 7 in FIG. 1 and coaxial with cables 30.

As shown by way of example, tensioning device 28 comprises a pair of known jaws 38 movable with respect to each other so as to open and close and simultaneously grip one end of strip 24 and cables 30 so as to keep them taut between half molds 17, 18 during the molding operation as described later on. More specifically, jaws 38 grip strip 24 and cables 30 at such a position as to leave a free end portion 39 of strip 24 and cables 30 long enough to be gripped by a second pair of jaws 40 located downstream from jaws 38 in the direction of arrow 21, and which open and close in the direction of arrows 42, and also travel parallel to strip 24 and cables 30 in the direction of arrows 44 by a predetermined distance substantially equal to the length of portions 39.

System 15 also comprises a known cutting device 46 (shown schematically in FIG. 3) movable in the direction of arrows 47, and which is brought up to strip 24 and cables 30 downstream from jaws 38 and upstream from jaws 40 in their closest position to device 28.

The method according to the present invention comprises a succession of timed stages performed in appropriate, continuously successive operating cycles of system 15. For example, according to a non-limiting operating mode, strip 24 and cables 30 are wound off their respective reels and kept taut between open half molds 17, 18 by jaws 38, which are closed to grip a free end portion 39 of strip 24 and cables 30 of a predetermined length.

Half molds 17, 18 are then closed to grip a portion of strip 24 corresponding to tape 5, and a corresponding portion of cables 30; and plastic material is injected along conduits 48 into chambers 22 and 36 so as to mold strip 2 and retaining elements 7 directly onto cables 30 and strip portion 24, which, except for any breakage of elements 2, 7, are thus embedded inseparably.

At this point, jaws 40, in the open position, are brought up to jaws 38 and closed so as to grip the free end portion 39 of strip 24 and cables 30; jaws 38 and half molds 17, 18 are then opened to release the by now hardened strip 2 and elements 7; jaws 40 are reversed, that is, moved to the right in FIG. 3, to unwind strip 24 and cables 30 tautly off respective reels 25, 32, and by a sufficient length for the next molding stage; jaws 38 are closed to grip and tension the next portion of strip 24 and cables 30 wound off reels 25 and 32 and extending through open half molds 17, 18; cutting device 46 is operated to cut strip 24 and cables 30 immediately downstream from jaws 38; jaws 40 are opened to detach and release the finished element 1, for example, by dropping it into a basket (not shown) beneath the limit stop position of jaws 40; and the cycle continues with the next injection stage so as to mold the next element 1.

Obviously, as opposed to gripping strip 24 and cables 30, both jaws 38, 40 may, with no substantial variations, grip different closely spaced points of the strip 2 molded in the previous molding stage. It is therefore to be understood that within the scope of the appended claims, the present invention may be practiced otherwise than as specifically described herein.

I claim:

1. An integrated upholstering element for securing a fabric cover to an article to be covered, comprising:

tape means having a first portion which is adapted to be secured to a fabric cover;

a supporting element connected to a second portion of said tape means; and at least one flexible tie member having a first end connected to said supporting element, and having at least one retaining member, for engaging a connecting member upon said article to be covered, connected to said at least one flexible tie member at a position adjacent to a second opposite end of said at least one flexible tie member;

said first end of said at least one flexible tie member and said second portion of said tape means being integrally incorporated in, and attached to, said supporting element as a result of said supporting element comprising synthetic plastic material and being molded onto said second portion of said tape means and said first end of said at least one flexible tie member so as to define a one-piece securing element.

2. An element as set forth in claim 1, wherein:

said supporting element comprises a flexible, injection molded strip;

said at least one flexible tie member comprises a plurality of tie members having the same overall length but different lengths of said first end portions thereof embedded within said supporting element; and said at least one retaining member comprises a plurality of retaining members fabricated from synthetic plastic material and respectively injection molded upon said plurality of tie members at different axial positions thereof.

3. An element as set forth in claim 2, wherein:

said supporting element has a plurality of openings formed therein so as to reduce the weight of said supporting element.

4. An element as set forth in claim 2, wherein:

said supporting element has a stepped configuration, in its longitudinal axial direction, comprising a plurality of stepped portions of different longitudinal axial extents within which said first end portions, of said different lengths, of said plurality of tie members are respectively embedded.

5. An element as set forth in claim 4, wherein:

said stepped portions of said support element are separated by sloped portions disposed at approximately 45° with respect to the longitudinal axis of said supporting element so as to facilitate bending and movement of the non-embedded portions of said plurality of tie members.

6. An element as set forth in claim 4, wherein:

said tape means comprises a strip of fabric having oppositely disposed longitudinally extending edge portions wherein one of said longitudinally extending edge portions is embedded within the stepped portion of said supporting element which has the longest longitudinal axial extent, and the opposite one of said longitudinally extending edge portions is adapted to be sewn to said fabric cover.

7. An element as set forth in claim 1, wherein:

said at least one flexible tie member comprises a stranded cable of flexible, inextensible plastic material.

8. An element as set forth in claim 7, wherein:

said plastic material comprising said at least one tie member comprises NYLON.

9. The element as set forth in claim 1, wherein:

said at least one retaining member comprises an element molded upon said at least one flexible tie member at said position adjacent to said second opposite end of said at least one flexible tie member.

10. A method for continuously molding a series of integrated upholstering elements for securing a fabric cover to an article to be covered, comprising the steps of:

providing a pair of mating half molds which are movable toward and away from each other between respective closed and opened positions;

moving said pair of mating half molds away from each other so that said pair of mating half molds are disposed at said opened position;

feeding a tape member and at least one flexible tie member between said opened mating half molds and from respective supply reels disposed upstream of said pair of mating half molds such that free end portions of said tape member and said at least one flexible tie member are gripped by gripping means disposed downstream of said pair of mating half molds whereby portions of said tape member and said at least one flexible tie member are held in a taut condition between said pair of mating half molds;

moving said pair of mating half molds toward each other so that said pair of mating half molds are disposed at said closed position;

injecting plastic material between said mating half molds so as to mold a supporting element having portions of said tape member and said at least one tie member embedded within said supporting element whereby an integrated upholstery element is formed;

moving said pair of mating half molds away from each other so that said pair of mating half molds are disposed at said opened position;

moving said integrated upholstery element out from between said pair of mating half molds while simultaneously moving new portions of said tape member and said at least one flexible tie member into position between said opened pair of mating half molds, in a longitudinal direction; and severing said integrated upholstery element from said new portions of said tape member and said at least one flexible tie member.

11. The method as set forth in claim 10, wherein:

a plurality of flexible tie members are fed between said mating half molds and subsequently embedded within said supporting element.

12. The method as set forth in claim 10, wherein said gripping means comprises first and second pairs of gripper jaws with each pair of gripper jaws being movable toward and away from each other between closed and opened positions, said first and second gripper jaws are longitudinally spaced from each other, and said method further comprises the steps of:

gripping a portion of said tape member and said at least one tie member, which extends longitudinally downstream from said first pair of gripper jaws, by said second pair of gripper jaws after said supporting element has been injection molded;

moving said first pair of gripper jaws to their opened position;

moving said second pair of gripper jaws longitudinally so as to move said integrated upholstery element out from between said pair of mating half molds and to a longitudinal position downstream of said first pair of gripper jaws;

moving said first pair of gripper jaws to their closed position so as to grip new portions of said tape member and said at least one flexible tie member; and severing said integrated upholstery element from said new portions of said tape member and said at least one flexible tie member gripped by said first pair of gripper jaws at a longitudinal position disposed immediately downstream of said first pair of gripper jaws.

13. The method as set forth in claim 10, further comprising the steps of:

injection molding at least one retaining member, for engaging a connecting member upon said article to be covered, upon said at least one flexible tie member.

14. The method as set forth in claim 10, further comprising the step of:

providing said pair of mating half molds with chambers into which said plastic material can be injected so as to form at least one retaining member upon said at least one flexible tie member at the same time that said supporting element is molded upon said tape member and said at least one flexible tie member.

15. Apparatus for continuously molding a series of integrated upholstering elements for securing a fabric cover to an article to be covered, comprising:

a pair of mating half molds which are movable toward and away from each other between respective closed and opened positions;

means for feeding a tape member and at least one flexible tie member into a mold cavity, defined between said pair of mating half molds when said pair of mating half molds are disposed at said closed position, from respective supply reels of said tape member and said at least one flexible tie member disposed upstream of said pair of mating half molds such that free end portions of said tape member and said at least one flexible tie member are disposed downstream of said pair of mating half molds;

gripping means disposed downstream of said pair of mating half molds for gripping said free end portions of said tape member and said at least one flexible tie member such that portions of said tape member and said at least one flexible tie member disposed within said mold cavity defined between said pair of mating half molds are maintained in a taut condition;

means for injecting plastic material into said mold cavity so as to embed said portions of said tape member and said at least one flexible tie member disposed within said mold cavity within an injection molded support element so as to form an integrated upholstery element; and cutting means for severing said integrated upholstery element from new portions of said tape member and said at least one flexible tie member disposed within said mold cavity and new free end portions of said tape member and said at least one flexible tie member gripped by said gripping means.

16. Apparatus as set forth in claim 15, wherein:

said cutting means is disposed downstream of said pair of mating half molds.

17. Apparatus as set forth in claim 16, further comprising:

second gripping means for gripping said free end portions of said integrated upholster element, originally held within said gripping means, and for moving said free end portions of said integrated upholstery element, and said integrated upholstery element, in a downstream direction away from said gripping means such that said cutting means can sever said integrated upholstery element from said new free end portions of said tape member and said at least one flexible tie member gripped by said gripping means.

18. Apparatus as set forth in claim 17, wherein:

said gripping means and said second gripping means each comprises a pair of gripper jaws which are movable toward and away from each other in a direction transverse to the direction of movement of said integrated upholstery element.

19. The apparatus as set forth in claim 15, wherein:

said pair of mating half molds are respectively provided with chamber means into which said plastic material can be injected so as to form at least one retaining member upon said at least one flexible tie member.

* * * * *